United States Patent [19]

Takizawa et al.

[11] Patent Number: 5,136,221
[45] Date of Patent: Aug. 4, 1992

[54] METHOD AND DEVICE FOR CONTROLLING A POWERED AUTOMOTIVE SEAT OF ROTATABLE TYPE

[75] Inventors: Kiyotaka Takizawa; Hiromitsu Ogasawara, both of Akishima, Japan

[73] Assignee: Tachi-S Co. LTD, Akishima, Japan

[21] Appl. No.: 686,190

[22] Filed: Apr. 16, 1991

[51] Int. Cl.$^5$ .............................................. B60N 2/14
[52] U.S. Cl. .................................... 318/567; 318/466; 364/424.05
[58] Field of Search ................... 318/34, 35, 51, 264, 318/265, 266, 283, 286, 466, 467, 468, 469, 470, 567; 364/424.05

[56] References Cited

U.S. PATENT DOCUMENTS

| | | | |
|---|---|---|---|
| 4,809,180 | 2/1989 | Smith | 364/424.05 |
| 4,812,838 | 3/1989 | Tashiro et al. | 340/825.06 |
| 5,000,505 | 3/1991 | Kawashita et al. | 296/65.1 |

Primary Examiner—Bentsu Ro
Attorney, Agent, or Firm—Oldham, Oldham & Wilson Co.

[57] ABSTRACT

Method and device for controlling a powered automotive seat of a rotatable type, wherein said seat is caused to move to a neutral position where said seat is free from contact with other adjacent fittings or other occupant, before being subjected to automatic rotation between drive position and climbing/descending position. Further, such automatic rotation of seat is permitted only when a door detector detects the door to be opened at an opening angle larger than a predetermined angle.

5 Claims, 13 Drawing Sheets

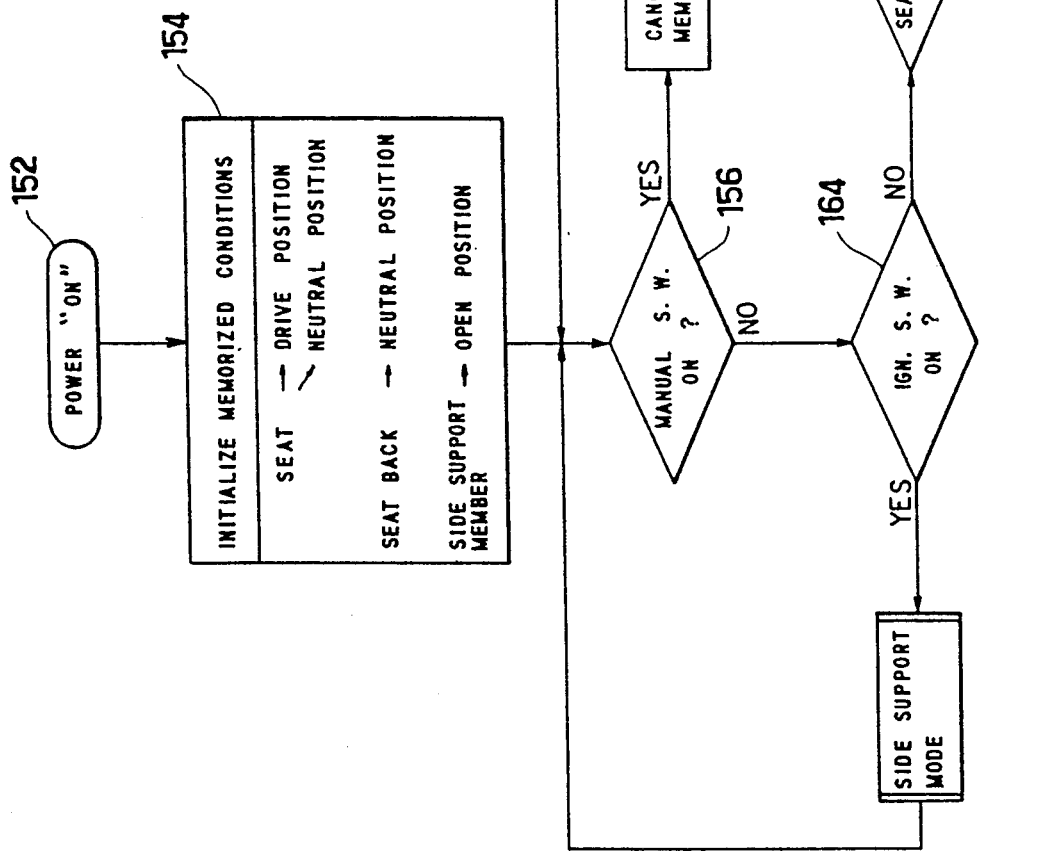

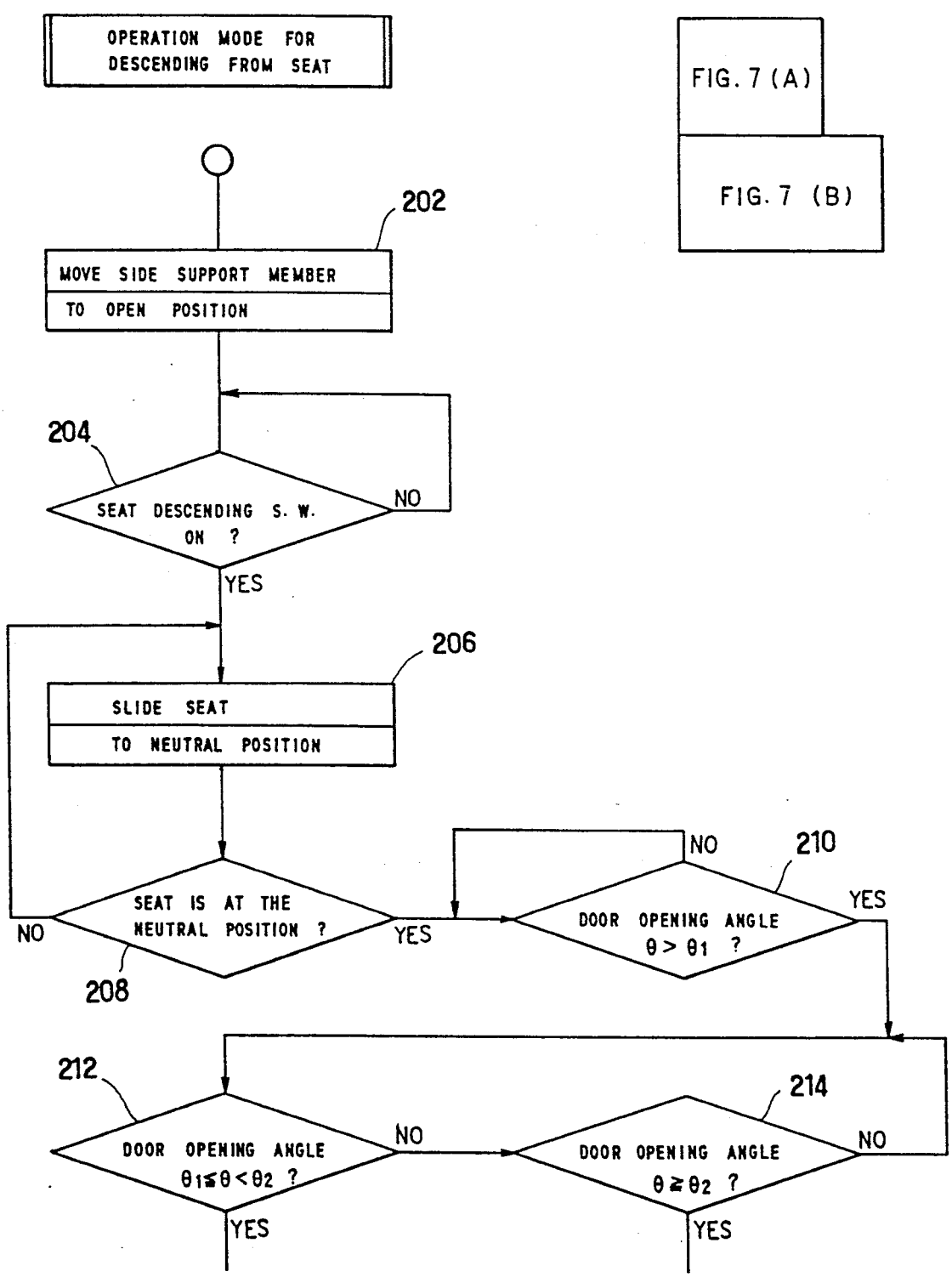

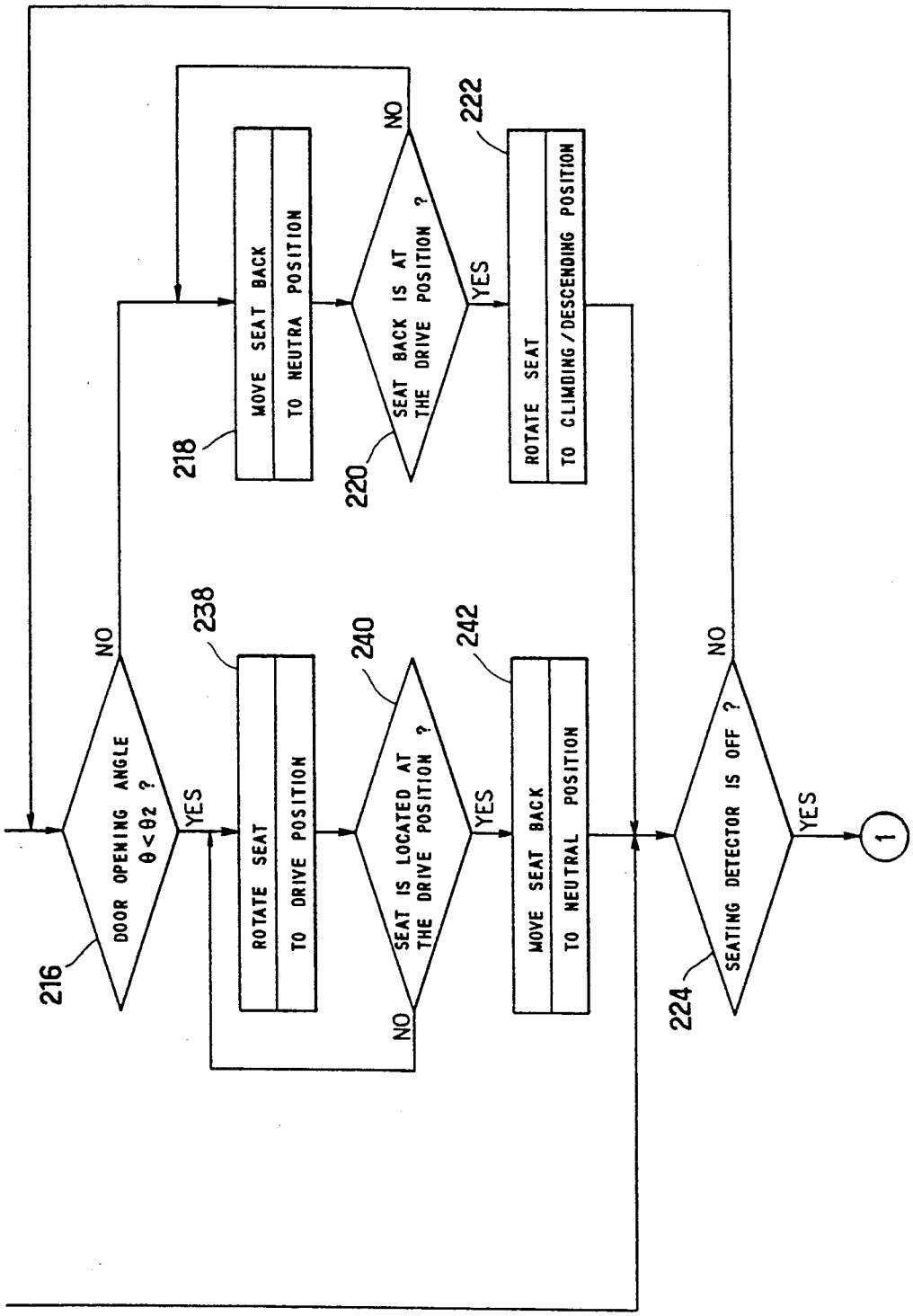

FIG.9
| FIG. 9 (A) |
| FIG. 9 (B) |
FIG.9 (A)
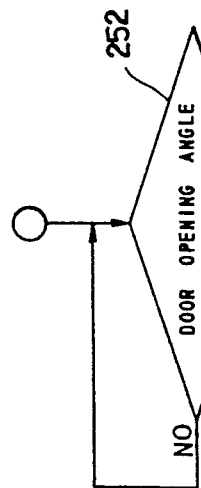
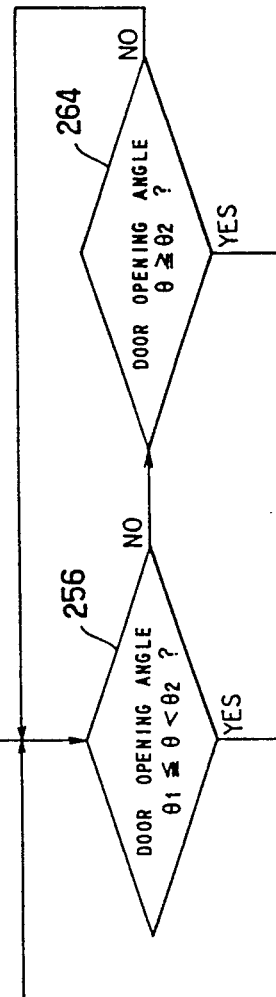

METHOD AND DEVICE FOR CONTROLLING A POWERED AUTOMOTIVE SEAT OF ROTATABLE TYPE

FIELD OF THE INVENTION

The present invention relates to a powered automotive seat of a rotatable type, and in particular to method and device for controlling the rotatable seat so as to cause rotation of the seat between a drive position and climbing/descending position.

DESCRIPTION OF PRIOR ART

A powered automotive seat of a rotatable type has been known, in which a seat rotation device actuated under a motor drive control is provided for adjustment of a seating posture of an occupant on the seat. The seat is rotated to change its seating direction by such seat rotation device. The motor in this sort of seat is controlled in its drive by a control device including a microcomputer therein.

In general, the rotatable powered seat is widely used for a driver's seat in the automobile, and controlled by operation of switches so as to be rotated towards a desired one of drive position and climbing/descending position, the drive position being a position where the occupant sits for driving the automobile and the climbing/descending position being a position where the seat is oriented towards the door of the automobile at a given angle, allowing the occupant to climb onto or descend from the seat. Hence, the occupant can easily, quickly climb onto and descend from the seat without hindrance of adjacent steering wheel or other fittings in the automobile.

By and large, this sort of rotatable powered seat is provided with a seat slide device, a reclining device or other seating posture adjustment devices, with a view to permitting adjustment of the seat in every angle for an optimal seating position for the occupant on the seat, according to his or her seating taste preferences from lengthy periods of sitting on the seat.

However, the above known rotatable powered seat has such shortcomings that the seat is rotated with associated parts adjusted as it is in the automobile: Namely, when the seat is rotated, for example, there is no initialization for the adjusted fore-and-aft position of the seat and reclining angle of the seat back, which results in the edges or end part of the seat back or seat cushion being contacted with the steering wheel, console boxes on the floor, or center pillar in the automobile, having a high possibility of the seat being forcibly blocked thereby against rotation. Consequently, the motor is also forcibly hindered in its drive, producing an over-current flow in the motor, which results in overheating or damage of the motor, not to mention the damage of the seat cushion, seat back or other associated members of the seat.

Solution to this problem has been proposed by the Japanese Patent Laid-Open Pub. No. 61-067663 which suggests to detect an overload state of a motor and immediately stop the motor, thereby protecting the motor against an over-current.

But, even this prior art is silent for preventing the overload state of motor beforehand and avoiding contact between the seat and other adjacent surrounding fittings. In particular, no technical consideration is made for a rear-seat occupant on a rear seat behind the rotatable powered seat; that is, for avoiding inadvertent rotation of the seat to hit the rear-seat occupant. Further, since the seat is rotated, irrespective of the door being opened or closed, there is a great likelihood of the foot of occupant on the seat being hit by the closed door, as a result of which the occupant is injured in the foot and also the door is deformed thereby.

SUMMARY OF THE INVENTION

In view of the shortcomings above, it is a purpose of the present invention to provide a method and device for controlling a powered automotive seat of a rotatable type, which avoids contact of the seat with other adjacent fittings or other occupant on other seat.

To attain such purpose, according to the present invention, it is such arranged that the seat is insured to move to a neutral position where the seat is free from contact with other adjacent fittings in the automobile and other occupant on other seat, prior to being subjected to automatic rotation of the seat between a drive position and climbing/descending position, the drive position being a location where the occupant drives the automobile and the climbing/descending position being a location where the occupant climbs onto or descends from the seat.

Accordingly, when the seat is rotated between the drive and climbing/descending positions, the seat is moved to the neutral position at a first motion step, and thus the occupant can climb onto or descend from the seat without contact with a steering wheel or the like.

It is a second purpose of the present invention to control the rotation of seat, responsive to a door of automobile being opened.

To this end, the present invention is of such arrangement wherein the automatic rotation of the seat to the climbing/descending position is effected only when a door detector detects the door to be opened at an opening angle larger than a given angle.

Accordingly, if the door is not opened over such given angle, the seat is prohibited in its rotation to the climbing/descending position, whereby a small opening of the door will not cause the seat to be rotated to that position and the occupant is protected against a hit with adjacent things in the automobile due to a tiny small opening of the door.

In another aspect of the invention, there is provided two-step detection as to the opening of the door; namely, there is defined a small door opening angle and a great door opening angle, depending on the circumstances under which the automobile runs. If the door is opened a little with its opening angle less than the small door opening angle, the seat is prohibited from the foregoing automatic rotation to the climbing/descending position. The safe conditions for the occupant are enhanced.

In still another aspect of the invention, there is provided a time delay arrangement in the step of causing return of the seat to the drive position with the seat being located at the climbing/descending position and occupant being about to descend from the seat. Namely, assuming that the occupant has the seat set at the climbing/descending position for descending from the seat, a time is delayed, when the seat is returned to the drive position, so that the occupant is not contacted with the seat which is quickly rotated to the drive position.

Preferably, the above control is applied to the fore-and-aft sliding movement of the seat and reclining angle of seat back thereof, in order that the fore-and-aft position and reclining angle of the seat are moved to the neutral position.

BRIEF DESCRIPTION OF THE DRAWINGS

FIGS. 6 through 10 are flow charts explaining operational procedures for effecting the control of the seat.

DETAILED DESCRIPTION OF PREFERRED EMBODIMENTS OF THE INVENTION

Figure 1:
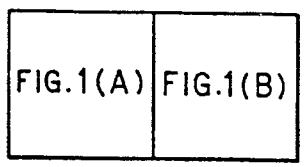
FIG. 1, consisting of FIGS. 1(A) and 1(B), is a block diagram of a device for controlling a rotatable powered automotive seat in accordance with the present invention.
Figure 2:
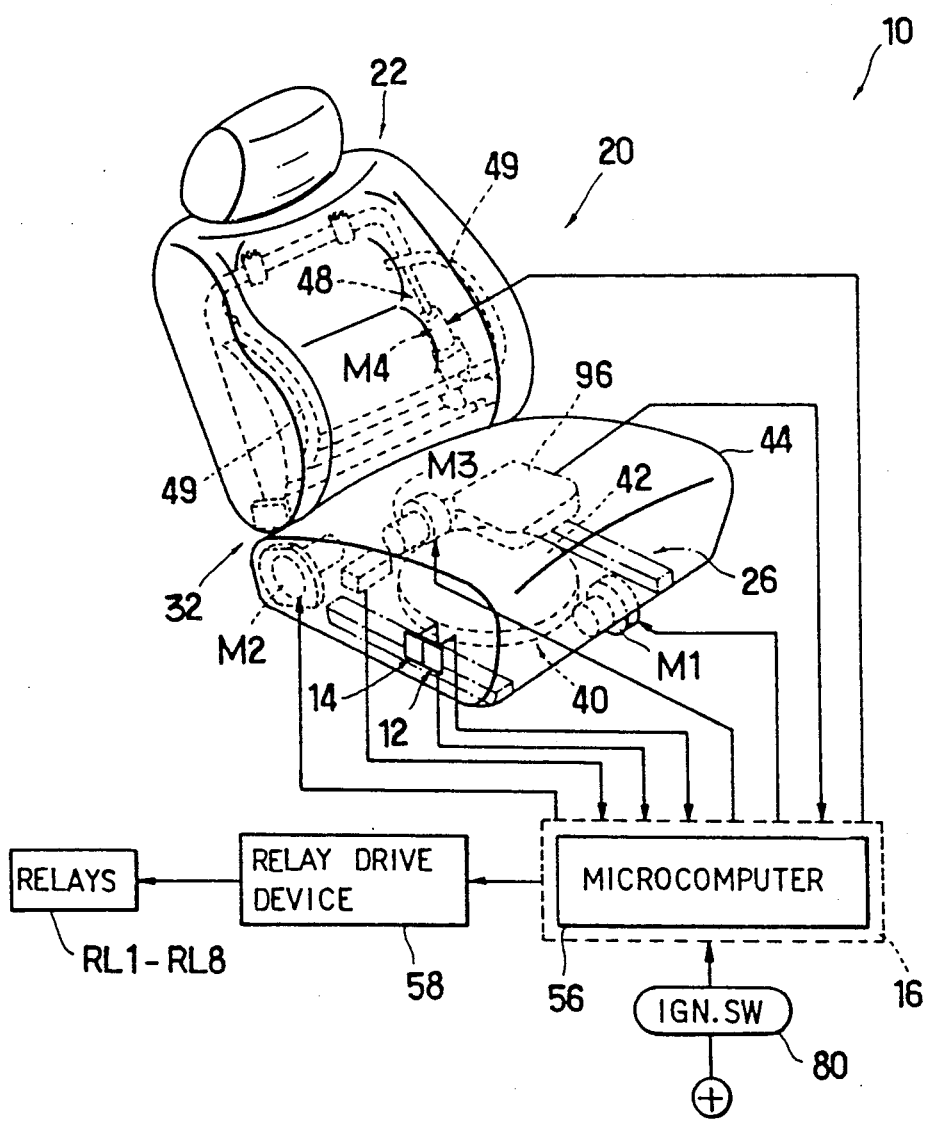
FIG. 2 is a schematic block diagram of the device as applied to the seat.

Referring to FIGS. 1 and 2, there is shown a device (10) for controlling a rotatable powered seat in accordance with the present invention.

The device (10) basically comprises an operation switch (12), a position detector (14), and a central processing unit (16) to be referred to as "CPU".

Designation (20) denotes a powered seat of rotatable type which is rotated and adjusted in its positions by means of the device (10), as will be explained in detail later.

Figure 3:
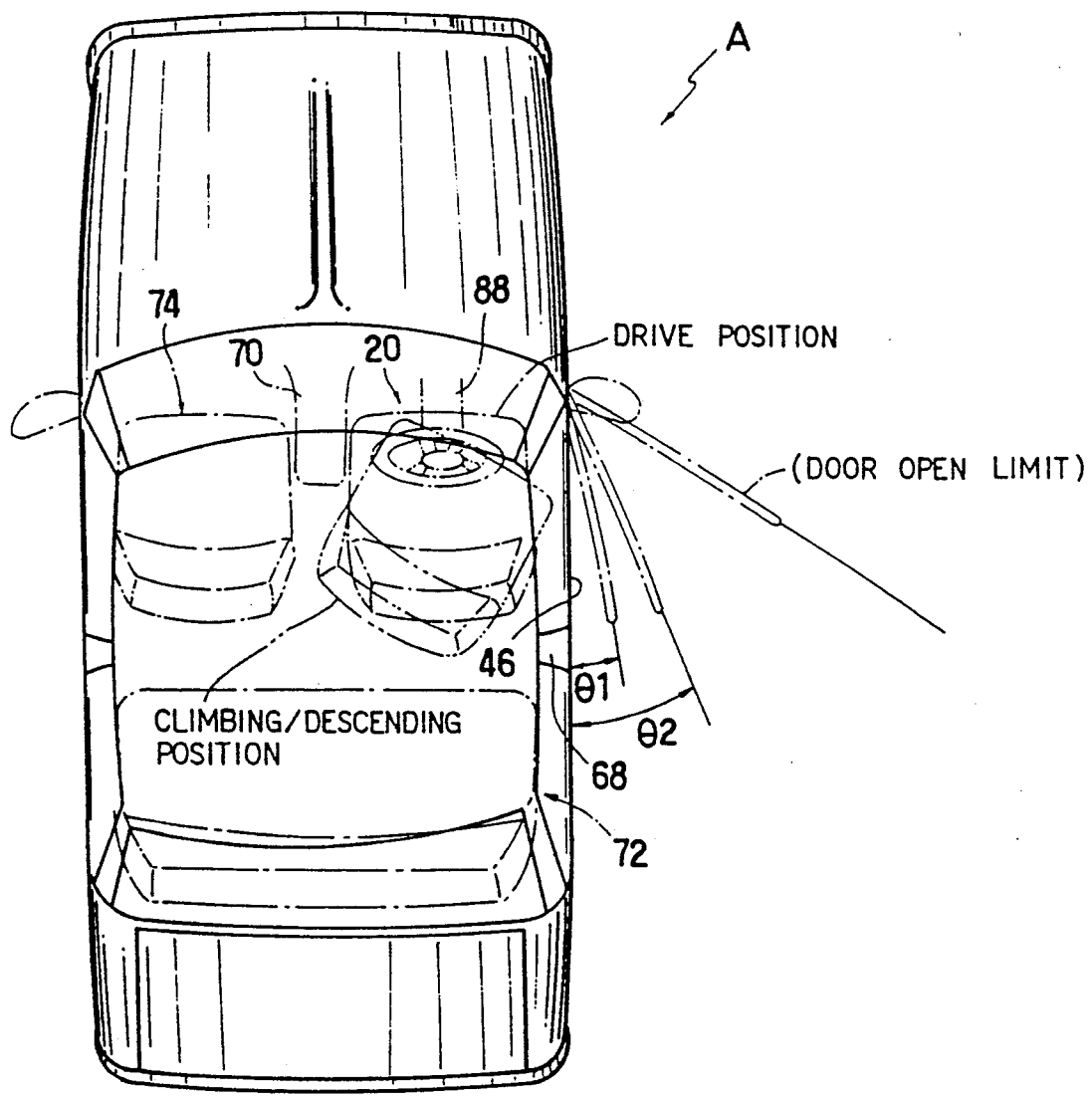
FIG. 3 is a schematic top view of an automobile to which the device is applied.

In the device (10), there are provided a slide motor (M1), a reclining motor (M2) and a rotation motor (M3), so that the rotatable seat (20) is moved forwardly and backwardly by the slide motor (M1) for fore-and-aft adjustment, a seat back (22) of the seat (20) is inclined forwardly and backwardly relative to a seat cushion (44) thereof by means of the reclining motor (M2) for reclining angle adjustment, and the rotation of seat (20) is effected by means of the rotation motor (M3) for adjusting the direction in which the seat is rotatively oriented in an automobile (A) (see FIG. 3). Those motors are preferably DC geared ones. In the herein embodiment, the rotatable seat (2) is described as a driver's seat.

Figure 4:
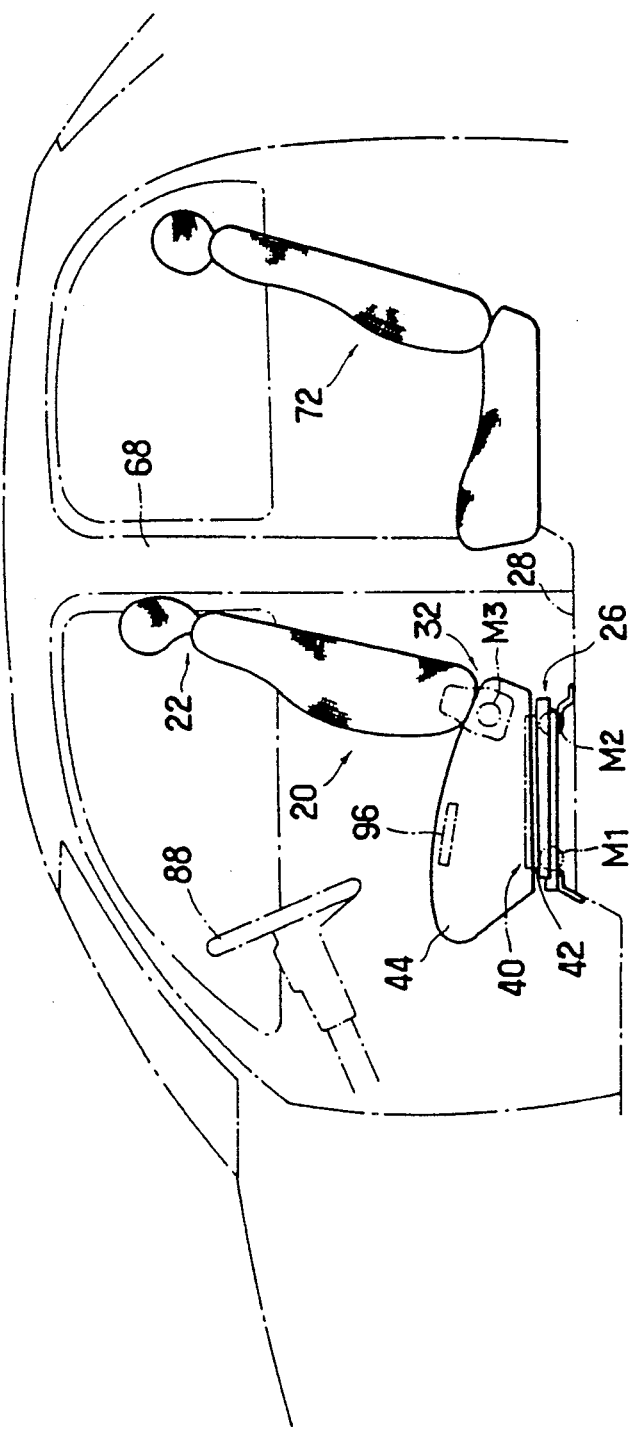
FIG. 4 is a schematic side view of the interior of the automobile.

The slide motor (M1), as seen from FIGS. 2 and 4, is adapted for actuating a seat slide device (26). The seat slide device (26) is disposed between the seat (20) and the floor (28) of automobile (A) and is moved in sliding way adjustably by means of the motor (M1) forwardly and backwardly along the lengthwise direction of automobile (A). The motor (M1) is equipped with a rotation sensor of lead switch type (not shown). The rotation sensor is electrically connected with the CPU (16) via an overload detector circuit (30), and outputs the number pulses generated from the rotation of motor (M1) to the CPU (16) so that the pulse number is counted in the CPU (16) for detecting a position of the seat (20) in fore-and-aft direction by the rotation number of motor (M1).

The reclining motor (M2) is adapted for actuating a reclining device (32). The reclining device (32) is constructed such that it is actuated by the motor (M2) to adjustably incline the seat back (22) forwardly and backwardly relative to the seat cushion (44), thereby permitting adjustment of reclining angle of the seat back (22). The reclining motor (M2), as can be seen from FIG. 1, is equipped with a rotation sensor composed of a light emitting diode (34) and photo-transistor (36). Such rotation sensor is electrically connected with the CPU (16) via the overload detector circuit (30). The photo-transistor (36) generates a pulse per rotation of the motor (M2), so that the number of pulses therefrom is detected as a rotation number of motor (M2) by the CPU (16). Hence, the CPU (16) detects the reclining angle of the seat back (22) by the motor rotation numbers detected. The combination of light emitting diode (34) and photo-transistor (36) are known as such rotation sensor and may be formed in other suitable way.

The rotation motor (M3) is adapted for actuating a seat rotation device (40). The seat rotation device (40), as shown in FIGS. 2 and 4, has a rotation disc (42) provided thereon which is operatively connected to the motor (M3). The rotation disc (42) is disposed at the bottom part of the seat cushion (44). According to this seat rotation device (40), a drive of the motor (M3) causes rotation of the disc (42) which then rotates the seat (20) within a given rotatable range on a horizontal plane.

As shown in FIG. 3, by such seat rotation device (40), the seat (20) is caused to rotate between a drive position and a climbing/descending position. At the drive position, the seat (20) is rotated and stopped there such as to be oriented forwardly for allowing an occupant to operate the steering wheel (88) for driving the automobile (A). On the other hand, at the climbing/descending position, the seat (20) is rotated and stopped there such as to be oriented towards the door (46) of automobile (A) for allowing the occupant to easily climb onto and descend from the seat (20). Preferably, the rotatable range or angle is approx. 30 degrees.

Similarly to the slide motor (M1), the rotation motor (M3) is electrically connected with the CPU (16) via the overload detector circuit (30), having a rotation sensor (not shown) equipped therewith. Likewise, the number of pulses generated from the rotation sensor is counted in the CPU (16) as number of rotations of the motor (M3), to thereby detect the rotation angle of the seat (20).

The seat slide device (26), reclining device (32), and seat rotation device (40) are all known ones. Therefore, further description is deleted on them for the sake of simplicity.

Figure 5:
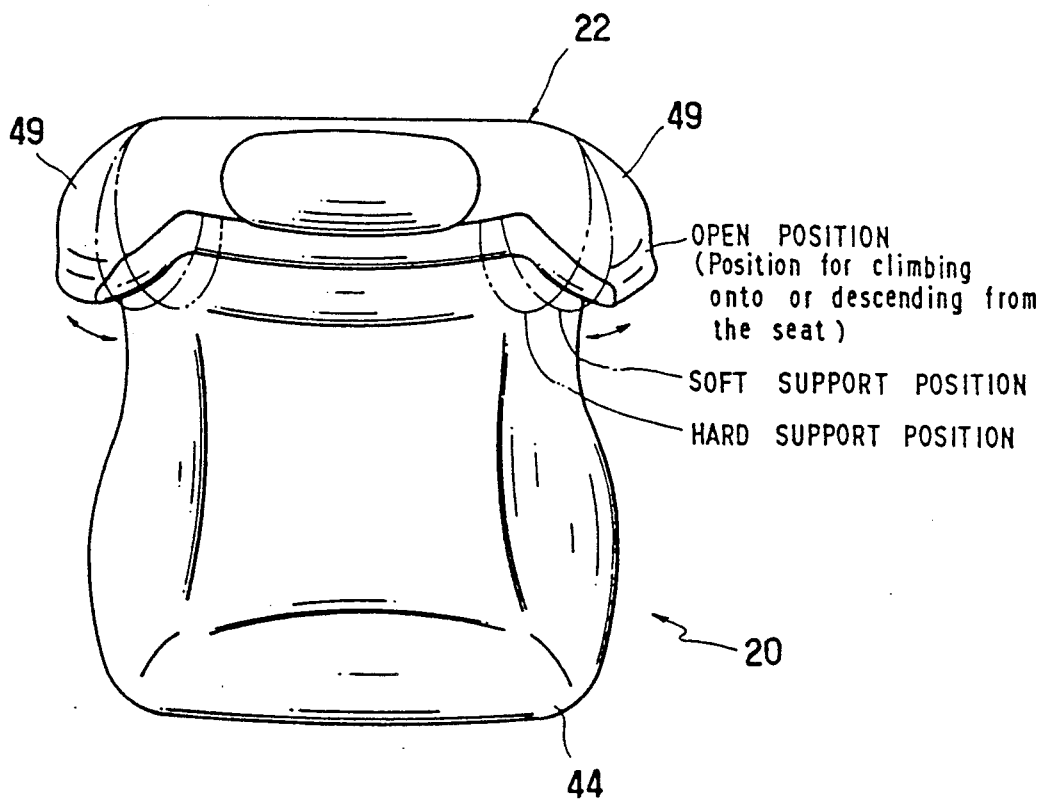
FIG. 5 is a schematic plan view of the seat to which the device is applied.

According to the device (10), there are further provided a motor (M4) which is for actuating a side support device (48). The side support device (48) includes a pair of spaced-apart side support members (49)(49) each being disposed in the respective both lateral sides of seat back (22). The two side support members (49)(49) are moved by means of the motor (M4) towards each other at two modes of support positions to be set forth later and away from each other at an open position (corresponding to the foregoing climbing/descending position) (see FIG. 5).

The side support members (49)(49) are normally located at the open position. Though not shown, the side support device (48) is actuated sensitive to a lateral acceleration applied to the seat (20), so as to cause the side support members (49)(49) to be moved toward the support position and held there in unmoved state for a given time. This insures to securely support the upper body part of an occupant on the seat. The side support members (49)(49), when located at the open position, are set away from each other so open as to allow the occupant to climb onto or descend from the seat (20). As shown in FIG. 4, the side support position of the members (49)(49) is divided into a soft support position suited for supporting the occupant loosely during drive on a city road and a hard support position suited for supporting the occupant securely, more positively than the soft support position, during drive on a winding road in a mountainous area. The side support device (48) is also a known device, and explanation thereon is deleted. Since the motor (M4) is not a subject matter of the present invention, the provision of the same is a matter of choice, and herein description just notes such applicability.

The above-stated three motors (M1)(M2)(M3) are controlled in their drives by the operation switch (12). As seen from FIG. 1, the operation switch (12) includes a manual switch group (12a) and automatic switch group (12b). The manual switch group (12a) comprises a slide switch (50), reclining switch (52) and rotation switch (54). Each of those three switches (50)(52)(54) is a self-return, seesaw type of switch having a neutral "off" position and two switch positions, as in FIG. 1, in order to change the rotation direction of respective those motors, and is further connected with the CPU (16), as shown in FIGS. 1 and 2.

The CPU (16) includes a microcomputer (56) The microcomputer (56) processes data input properly according to a predetermined program stored in memory of the microcomputer (56), which will be explained later, and outputs an appropriate control signal. As understandable from FIGS. 1 and 2, when the control signal is outputted from the CPU, the relay drive device is activated to energize a corresponding one of relays (RL1 to RL6) to change over the associated one of relay contacts (RL1a to RL6a), thereby activating the corresponding one of the foregoing three motors (M1)(M2)(M3). For instance, with the seat (20) being located at a certain position, operating the slide switch (50) of manual switch group (12a) emits a signal into the CPU (16), and the CPU (16) outputs a proper control signal to the relay drive device (58). The relay drive device (5) causes a corresponding one of the relays (RL1)(RL2) to be energized so as to change over the associated relay contacts (RL1a) (RL2a), with the result that the motor (M1) is driven in a corresponding direction to cause the seat (20) to be moved forwardly or backwardly. Thus, adjustment of fore-and-aft position of the seat (20) may be made as desired.

Figure 1A:
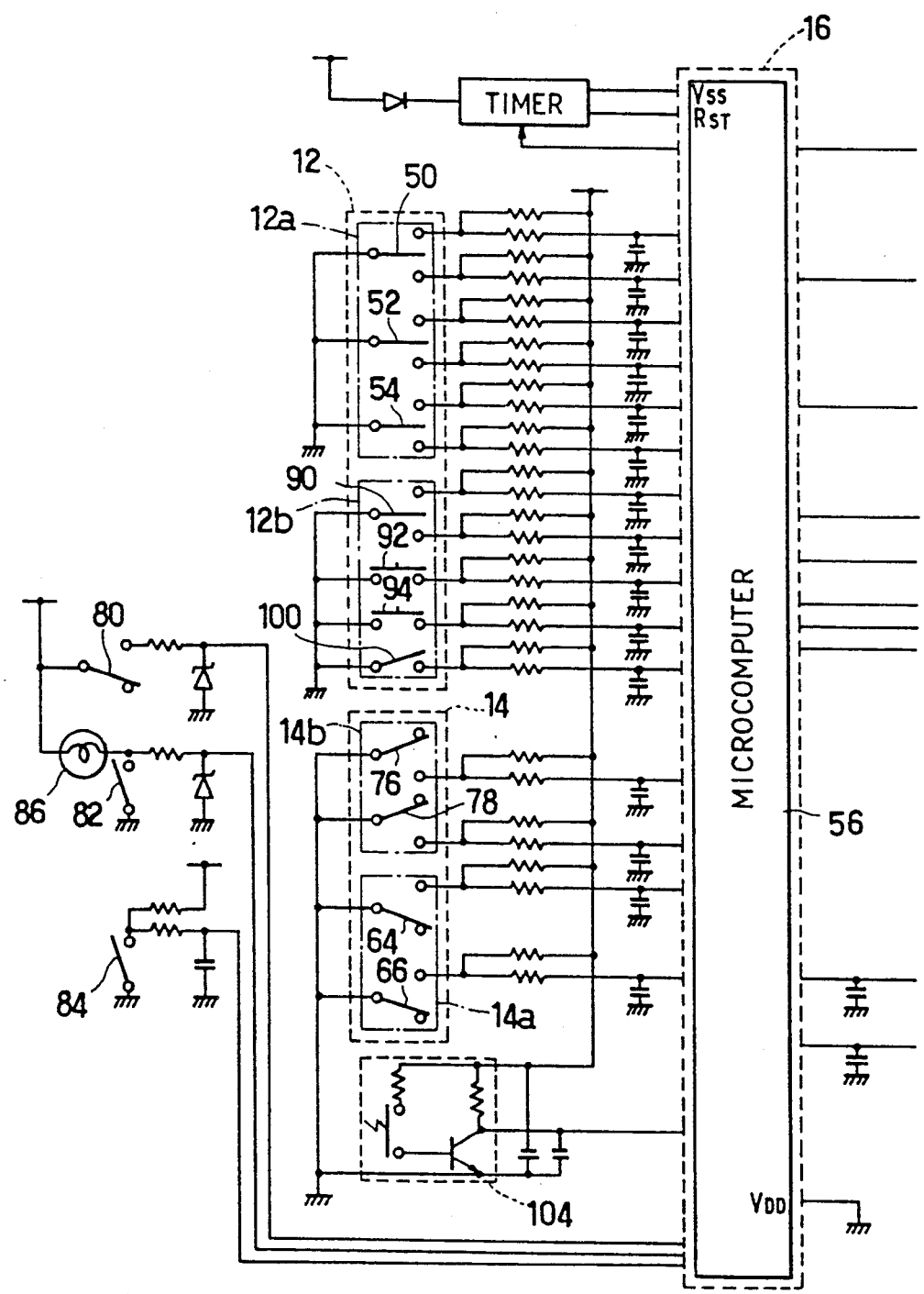
Figure 1B:
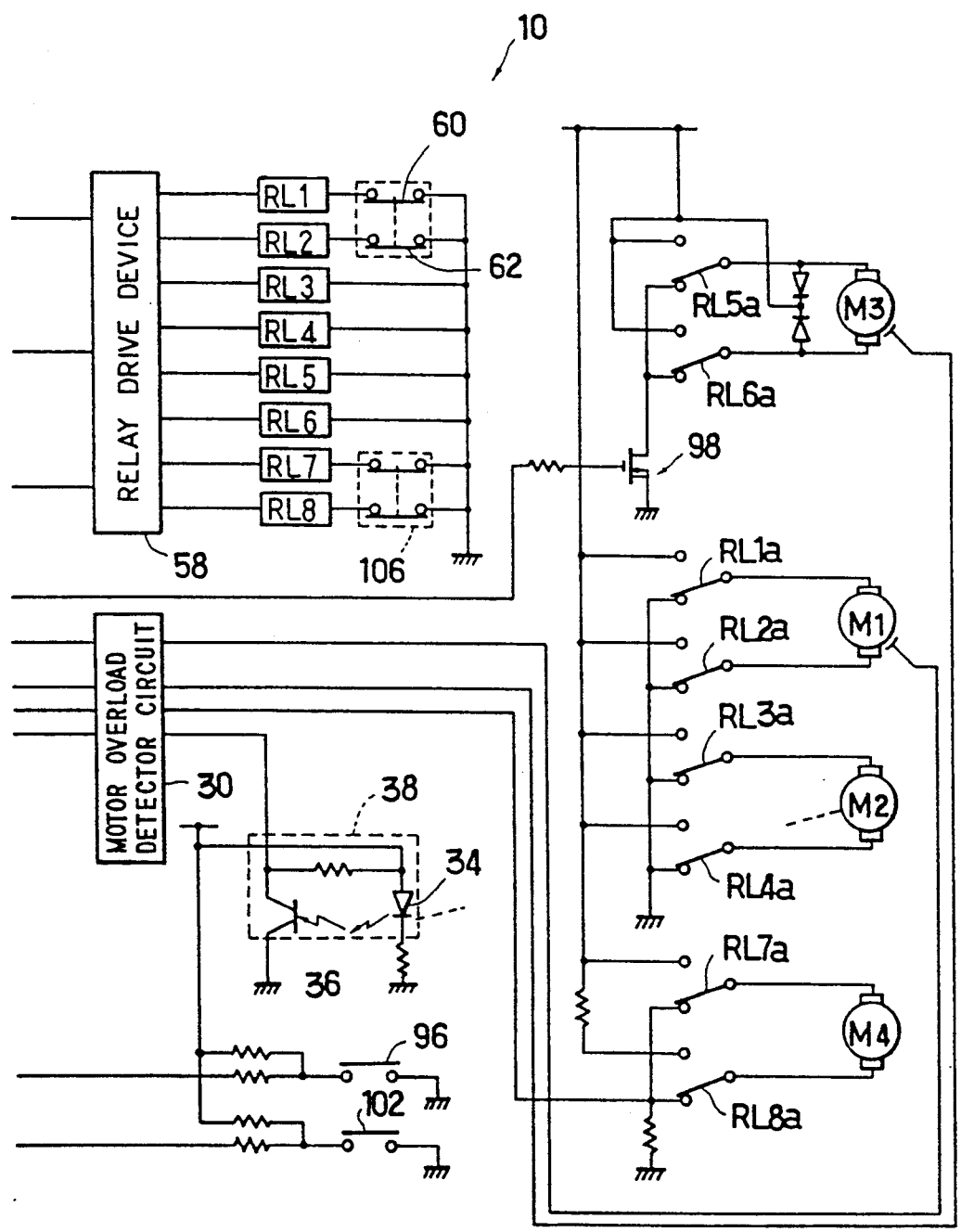

FIG. 1(B) shows connection of those relays (RL1) (RL2) with a first slide limit switch (60) and second slide limit switch (62), respectively. The two limit switches (60)(62) are each a self-return, push type of switch, and so arranged that the first slide limit switch (60) is turned off when the seat (20) reaches a forward limit point, whereas the second one (62) is turned off when the seat (20) reaches a backward limit point. Such "off" switching in each of first and second limit switches (60)(62) deenergizes the corresponding one of relays (RL1)(RL2) to thereby cause the slide motor (M1) to be stopped. In this way, the seat (20) is limited in its sliding movement at the forward and backward limit points, thus preventing over-run of the seat (20) in the fore-and-aft direction.

The slide switch (50) is operable normally to adjust the fore-and-aft position of seat (20) at the drive position, or to set another drive position for other drivers than a specified owner-driver.

With regard to the reclining and rotation switches (52)(54), likewise as above, when they are operated, their respective corresponding signals are input into the CPU (16), which then activates the relay drive device (58) to energize corresponding ones of the relays (RL3 to RL6), thus changing over associated ones of relay contacts (RL3a to RL6a) to cause the corresponding motors (M2)(M3) in a given direction, whereby the seat back (22) is inclined forwardly or backwardly, and at the same time, the seat (20) is rotated to one of the foregoing drive and climbing/descending positions.

The relays (RL7)(RL8) are associated with the above-mentioned motor (14) for the side support device (48). In this case, energizing one of the relays (RL7)(RL8) results in changing over the associated one of relay contacts (RL7a)(RL8a) for controlling drive direction of the motor (14), as similar to the above descriptions.

The reclining angle range of the seat back (22) is set by the number of pulses being detected from the rotation detector circuit (38). Thus, once such reclining range is preset, using the detector (38), the forward and backward inclination of the seat back (22) is limited within thus-preset range, whereupon, the seat back (22), which in inclined to reach a preset limit point is the range, is stopped there by reason of the reclining motor (M2) being at once stopped in its drive in the present device (10). The reclining angle range may be set, using suitable limit switches, instead of such pulse detection system.

The above-stated rotation sensors respectively of three motors (M1)(M2)(M3) are electrically connected with the CPU (16) via the overload detector circuit (30). The overload detector circuit (30) monitors and detects the rotation speed each of those motors (M1)(M2)(M3), sensitive to a pulse frequency from each of the rotation sensors, making comparison between the detected data and a preset data. According thereto, if the rotation speed of the motors is lowered below the preset data, the circuit (30) decides the motors are in an overload state, sending to the CPU (15) a stop signal calling for stop of the motors (M1)(M2)(M3). Then, the CPU (15) outputs an instruction signal to cause them to immediately cease their drives. This system is advantageous in avoiding an overheat or damage of the motors in the overload case.

The position detector (14) includes a rotation detecting switch (14a) which is operable to limit the rotatable range of the seat (20). As best seen from FIG. 1(A), the rotation detecting switch (14a) includes a drive position switch (64) and a climbing/descending switch (66), each of which is a self-return, push type of switch and connected with the CPU (16) electrically. The drive position switch (64) is for detecting whether the seat (20) reaches the drive position: Namely, upon the seat (20) reaching there, the switch (64) is turned on, thereby causing quick stop of the rotation motor (M3) through the CPU (16). Likewise, the climbing/descending switch (66) is for detecting whether the seat (20) reaches the climbing/descending position, or not, and if yes, the switch (66) is turned on to stop the motor (M3). Thus, the seat (20) is assuredly limited in its rotation within a given rotatable range between the drive and climbing/descending positions.

According to the present invention, the control device (10) is further arranged such that the above-described rotation of seat (20) between the drive and climbing/descending positions is not affected unless the seat (20) as well as its seat back (22) are set at a neutral position. In that respect, it is defined hereby that such neutral position is set at a point where the seat (20), while being rotated between the drive and climbing/descending positions, is kept away from contact with a center pillar (68) and console box (7) of automobile body (A) as well as an occupant sitting on a rear seat (72) (see FIG. 3). Preferably, the neutral position should be set at approx. 40 mm forwardly from a rearmost point.

Such neutral position for the seat (20) and seat back (22) is detected by a neutral position switch (14b). The neutral position switch (14b), as in FIG. 1(A), includes a slide neutral switch (76) for detecting whether the seat is located at the neutral position in the fore-and-aft direction, or not, and a reclining neutral switch (78) for detecting whether the seat back (22) is located at the neutral position in the fore-and-aft direction, or not, Each of those two switches (76)(78) is a self-return, push type of switch and connected electrically with the CPU (16). They are turned on, responsive to the seat (20) and seat back (22) reaching the neutral position, so as to send a signal to the CPU (16) for immediate stop of the corresponding motors (M1) (M2). It should be noted that the CPU (16) at the same time monitors the sliding motion of seat (20) and inclination motion of seat back (22) until they reach the neutral position defined above, while prohibiting rotation of the seat (20) between the drive and climbing/descending positions. Thus, such prohibition is not cancelled until the foregoing two neutral switches (76)(78) are turned on. Accordingly, the seat (20) is protected against contact with adjacent surrounding fittings or things in the automobile (A), when it is rotated to one of the drive and climbing/descending positions. This also prevents injury of the rear-seat occupant.

Designation (80) denotes an ignition switch of the automobile (A) which is connected electrically with the CPU (15).

According to the invention, only when the ignition switch (80) is turned off, which means non-work of the engine of automobile (A), the rotation motor (M3) is permitted to be driven for rotation of the seat (20). Hence, insofar as the ignition switch (80) is in "on" state, the above-described rotation of seat is prohibited for a safety purpose and insuring to avoid inadvertent rotation of seat (20).

In still another aspect of the invention, there are provided a pair of first and second door detectors (82)(84), as seen in FIG. 1(A), as a means for the same purpose of prohibiting the rotation of seat (20).

The first door detector (82) is arranged to detect whether the door (46) is opened in excess of a first opening angle ($\theta_1$), or not. The first door opening angle ($\theta_1$) is defined at such a degree sufficient to allow the occupant to push the door (46) a smallest possible amount for attaining a backward view, for example when he or she drives the automobile (A) backwards. A door switch to light on a room lamp (86) may be employed for such first door detector (82).

The second door detector (84) is arranged to detect whether the door (46) is opened in excess of a second opening angle ($\theta_2$), or not. The second opening angle ($\theta_2$) is defined at a smallest possible degree for avoiding contact of the occupant's foot with the door during rotation of seat (20). The second door detector (84) may use a self-return, push type of switch, and is provided, independently of the first door detector (82).

Those first and second door detectors (82)(84) are electrically connected with the CPU(16), as shown.

With such arrangement of door detectors, the seat (20) is only permitted to rotate when the door (46) is opened in excess of the second opening angle ($\theta_2$). Thus, insofar as the door (46) is opened a little bit within such second angle ($\theta_2$), the rotation motor (M3) is not instructed for drive by the CPU (16), thereby preventing the seat (20) against rotation between the drive and climbing/descending positions, and securing a safe condition for the occupant on the seat (20).

It should be noted here that, even if the door (46) is opened within such second angle ($\theta_2$), the aforementioned neutralization of seat (20) and seat back (22) is carried out, so that, before the seat (20) is rotated, the seat (20) and seat back (22) are moved to the neutral position. Accordingly, it is appreciated that, by virtue of such neutral positioning, the seat (20) is slidingly moved more backwardly from a normal drive position, and the seat back (22) is inclined closer to a vertical line than the normal reclining angle, whereupon in spite of the door (46) being opened a little at such second angle ($\theta_2$), an occupant can climb onto or descend from the seat (20) without contact with the steering wheel (88) and other adjacent fittings in the automobile (A). This means also enables the occupant to manage to get on and out of the automobile, with the door (46) opened at the smallest possible angle.

The automatic switch (12b) includes a seat climbing switch (90), a seat descending switch (92) and a memory switch (94).

The memory switch (94) is operable to set and store in memory of the CPU (16) a position of the seat (20) and a reclining angle of the seat back (22).

The climbing switch (90) is operable to cause the seat (20) to be rotated to the drive position, and call a memorized sequence in the CPU (16) for causing automatic inclination of the seat back (22) at memorized reclining angle.

The descending switch (92) is operable to cause automatic rotation of the seat (20) as well as automatic inclination of the seat back (22) towards the drive position.

Designation (96) stands for a seating detector for detecting the presence and absence of an occupant on the seat (20). Preferably, the seating detector (96) is a pressure sensor. As shown in FIGS. 2 and 4, the seating detector (96) is disposed within the seat cushion (44) and electrically connected with the CPU (16) (see FIG. 1 also) Upon an occupant sitting on the seat (20), the seating detector (96) detects a pressure from the occupant, and sends a signal to the CPU (16). Then, the CPU (16) instructs the motor (M3) to cause rotation of the seat (20) to one of the drive and climbing/descending positions.

As best shown in FIG. 1(B), there is provided a speed adjustment device (98), by which the seat (20) is adjustably changed in its rotation speed between the drive and climbing/descending positions. Thus, the occupant can enjoy an optimal rotation of the seat (20) as he or she wants to feel the seat rotation comfortably.

The operation switch (12) and position detector (14) are disposed at the lateral wall of seat cushion (44). But this is not limitative for the invention, but those switches may be disposed at any other location to which the occupant may have easy access.

Designation (100) denotes a selection switch associated with the side support device (48). By operation of this switch (100), the two side support members (49) can be moved to a desired support position. The side support device (48) is electrically connected with the CPU

(16) and so arranged as be automatically moved to the selected support, sensitive to a lateral acceleration in excess of a standard degree being applied to the automobile (A).

Designations (104)(106) denote a position detectors associated with the side support device (48), which detects a position of the two side support members (49).

Now, reference is made to FIGS. 6 through 10. A description hereinafter will be made of a method for controlling the seat (20) on the basis of the above-described rotatable seat control device (10). The description will be given mainly with regard to the rotation motions of the seat (20) when the door (46) is opened and closed.

Referring firstly to FIG. 6, at first block (152), the CPU (16) is turned on, and then, the memorized conditions remaining in the CPU (16) are initialized, at (154): The seat (20), seat back (22) and side support members (49) are automatically returned to their respective initial positions, as shown. Thereafter, at block (156), it is determined whether or not the manual switch (12a) of the operation switch (12) is turned on.

Let us assume that one of the switches (50, 52, 54) in the manual switch (12a) is operated, thus placing the manual switch (12a) in an "on" state. "YES" is decided at the block (156). Then the step flow proceeds to a block (158) wherein all the ongoing operations, i.e. the memorized automatic operations for driving the motors (M1)(M2)(M3) under control of the climbing switch (90) and descending switch (92) to move the seat (20) and seat back (22) to their respective memory or neutral positions, are cancelled and brought to stop. Thereafter, the step is led to the manual operation sub routines at block (160), wherein the motors (M1)(M2)(M3) ought to be controlled by operation of the manual switch (12a).

In the manual operation sub routines, no specific description is given here, because the fore-and-aft movement of the seat (20) and reclining motions of the seat back (22) may be controlled in a free way by operating the manual switch (12a), and a commonly available control method may be employed in this manual sub routine.

After having adjusted the positions of seat (20) and seat back (22) according to a preference of the occupant at the foregoing manual operation sub routine, the adjusted positions may be preset as a memory 1 and memory 2, for example, by operating the climbing switch (90) and be stored in memory by operating the memory switch (94), as indicated by a block (162).

Turning to the block (156), non-operation of the manual switch (12a) (i.e. in "off" state ) gives "NO" answer there, leading the step flow to a next block (164) for determining whether the ignition switch (80) is turned on, or not. Now, assuming that an occupant finishes driving the automobile (1) and still sits on the seat (20), not descending therefrom, and he or she turns off the ignition switch (12a), then "NO" is decided at the block (164) and the step proceeds to a block (166) in which whether the seating detector (96) is in "on" state or not is determined, in order to ascertain the presence or absence of the occupant on the seat (20). As the occupant sits on the seat (20), the block (166) answers "YES", which turns the step flow to block (168) for effecting sub routine concerning the steps for descending from the seat (20).

FIG. 7, consisting of FIGS. 7(A) and 7(B), shows such sub routine for executing operation procedures for permitting the occupant to descend from the seat (20). According thereto, firstly viewing FIG. 7(A), at a block (202), the motor (M4) is driven to move the two side support members (49) towards the open position, and then at block (204), it is determined whether the descending switch (92) is turned on, or not. At this stage, "NO" decision is retained there until the descending switch (92) is turned on, thus giving a waiting time to ascertain the "on" state of the switch (92). Thereafter, with the descending switch (92) being turned on, "YES" decision at that block (204) leads the step to block (206) in which the motor (M1) is driven to slidingly move the seat (20) towards the neutral position, and at block (208) whether the seat (20) reaches the neutral position or not is determined. Here, "NO" decision is retained until the seat (20) reaches the neutral position, thereby giving a waiting time to ascertain the arrival of seat (20) at that position.

Then, the arrival of seat (20) at the neutral position gives "YES" answer at the block (208), and next, determination is made at (210) as to whether the opening angle of the door (46) is $\theta > \theta_1$, or not. Here, "NO" decision is retained until the door (46) is opened at a greater angle than the set angle ($\theta_1$), thus giving a waiting time to ascertain such greater opening of door (46). This waiting is effective for preventing rotation of the seat (20) in case of the occupant opening the door (46) just to see rearward of the automobile (A) with no intention to descend from the seat. When the door (46) is opened greatly, exceeding its opening angle over the set one ($\theta_1$), "YES" is decided at block (210), and the step is led to block (212), in which it is determined whether the opening angle of door (46) falls in an angle range of $\theta_1 \leq \theta - \eta_2$, or not. Now, assuming that the door (46) is opened at a greater angle than for the reason of parking area being quite wide for the automobile (A) to enter there, then "NO" is answered at the block (212), leading the step flow to next block (214) for determining whether the opening angle of door (46) is $\theta \geq \theta_2$, or not. If "YES" is decided there, the door (46) is moved and then finally it is determined at (216) whether the door opening angle falls in the range of $\theta < \theta_2$, or not. If "NO" there, the step flow is led to a block (218) concerning the seat back (22), for instructing the seat back (22) to move toward the neutral position. Subsequent block (220) ascertains whether the seat back reaches the neutral position, or not. Here, "NO" decision is retained until the seat back (22) reaches the neutral position. Thereafter, with "YES" answered at the block (220), as seen from block (222), the motor (M3) is driven to move the seat (20) from the drive position to the climbing/ descending position. Thus, the occupant can descend from the seat (20).

Next, at (224), it is checked whether the seating detector (96) is turned off, or not. If the occupant descend from the seat (20), "YES" is answered there, leading the step to determination at (226) in FIG. 8 as to whether the rotation of seat (20) is completed, or not; namely, whether the seat is stopped or not. If the seat is stopped at the drive position after the occupant has descended therefrom, "YES" is decided at the block (226), and then at (228), it is checked whether the seat (20) is located at the drive position, or not.

Figure 8:
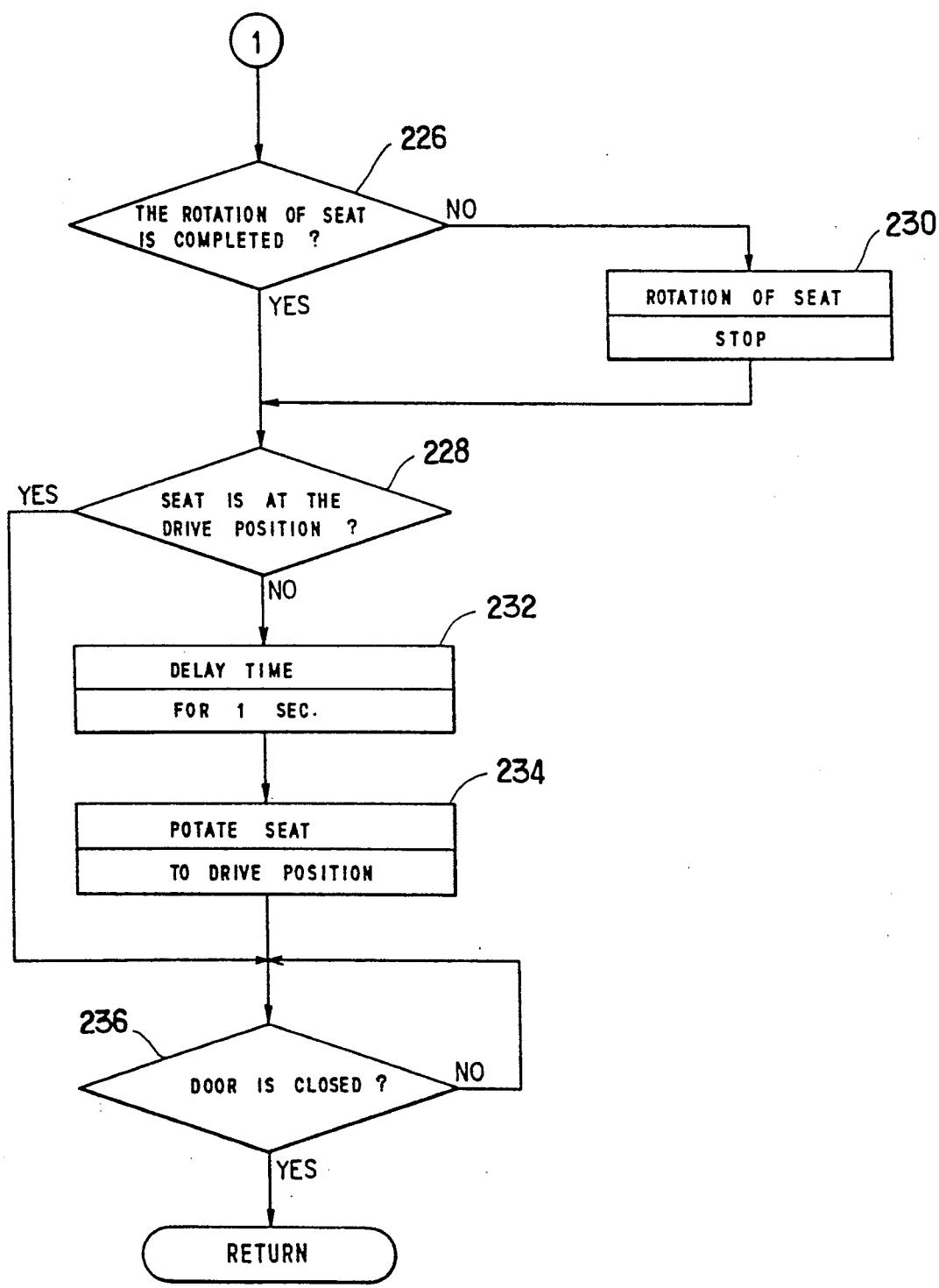

In such procedure, provided that the occupant leaves the seat (20) in the middle of its rotation, with the seating detector (96) being "off", then at the block (224) in FIG. 7(B), "YES" is decided, and then at (226) in FIG. (8), "NO" is decided, whereupon the motor (M3) is immediately stopped to prevent the seat (28) from being further rotated as indicated at the block (230) in FIG. 8.

Further, on the contrary, if the seat is located at the climbing/descending position, "NO" is answered at that block (228), turning the step flow to a block (232) for effecting a time delay for 1 sec. and thereafter, at (234), the motor (M3) is driven to rotate the seat (20) to the drive position. Accordingly, it is appreciated that after the occupant has left from the seat (20), such 1 sec. time delay is carried out for maintaining the seat (20) in non-rotated state, whereby there is eliminated such possibility that the occupant's foot is contacted with or hit by the seat (20). Then, at (236), it is ascertained whether or not the door (68) is closed. If "YES" there, the step is returned to the main routine in FIG. 6.

With the above-described procedures, the seat (20) is rotated at the neutral position, thereby allowing the occupant to easily, safely descend from the seat (20).

In this descending procedure, if the occupant however opens the door (46) at a great opening angle firstly (i.e. $\theta \geq \theta_2$) and then drawing it at a small opening angle less than the second opening angle ($\theta_2$), the step is turned to the blocks (214)(216) in FIG. 7, answering "YES" there all, thereby causing the rotation motor (M3) to be driven, irrespective of where the seat (20) is located, so as to move the seat back (22) towards the drive position, as indicated at the block (238) in FIG. 7(B). With "YES" answered at next block (240), the reclining motor (M2) is then driven to incline the seat back (22) towards the neutral position. Thereafter, at the block (224), it is checked up whether the occupant is present or absent on the seat (20). If the occupant does not descend from the seat (20), with "NO" answered at that block (224), the step flow is turned back to the block (216) for ascertaining the opening angle of door (46).

At such block (216) or block (218), if "YES" is decided as the door (46) is opened at an opening angle less than the set one ($\theta_2$), and at the same time the occupant descends from the seat (20) to get out of the automobile (A), then the seating detector (96) is turned off, with "YES" given at the block (224). The step flow is passed through the two blocks (226)(228), checking up whether the rotation of seat (20) is done or not and whether it is located at the drive position, or not. In view of the fact that the opening angle of door (46) is less than the set one ($\theta_2$) and the seat (20) is stopped at the drive position, "YES" decision is made at those blocks (226)(228), and the door (46) is closed, giving "YES" at the block (236), which results in returning the step flow to the main routine in FIG. 6. Thus, in the case where, for example, the door (46) can not be opened over such set angle ($\theta_2$) in a small space in a parking area, opening the door will then be taken by the CPU (16) to prohibit the rotation of seat (20), and thus the seat (20) is not rotated. However, in this case, the seat (20) and seat back (22) are set at the neutral position, so that the occupant can descend from the seat (20) without contact therewith, in spite of the rotation of seat (20).

On the contrary, if the occupant gets on the automobile (A) before climbing onto the seat (22), the seating detector (96) is in an "on" state since nobody is thereon, which gives "NO" decision at the block (166) in FIG. 6, leading the step flow to the sub routine in FIG. 9, which is for operation procedures for allowing the occupant to climb onto the seat (20).

Figure 9B:
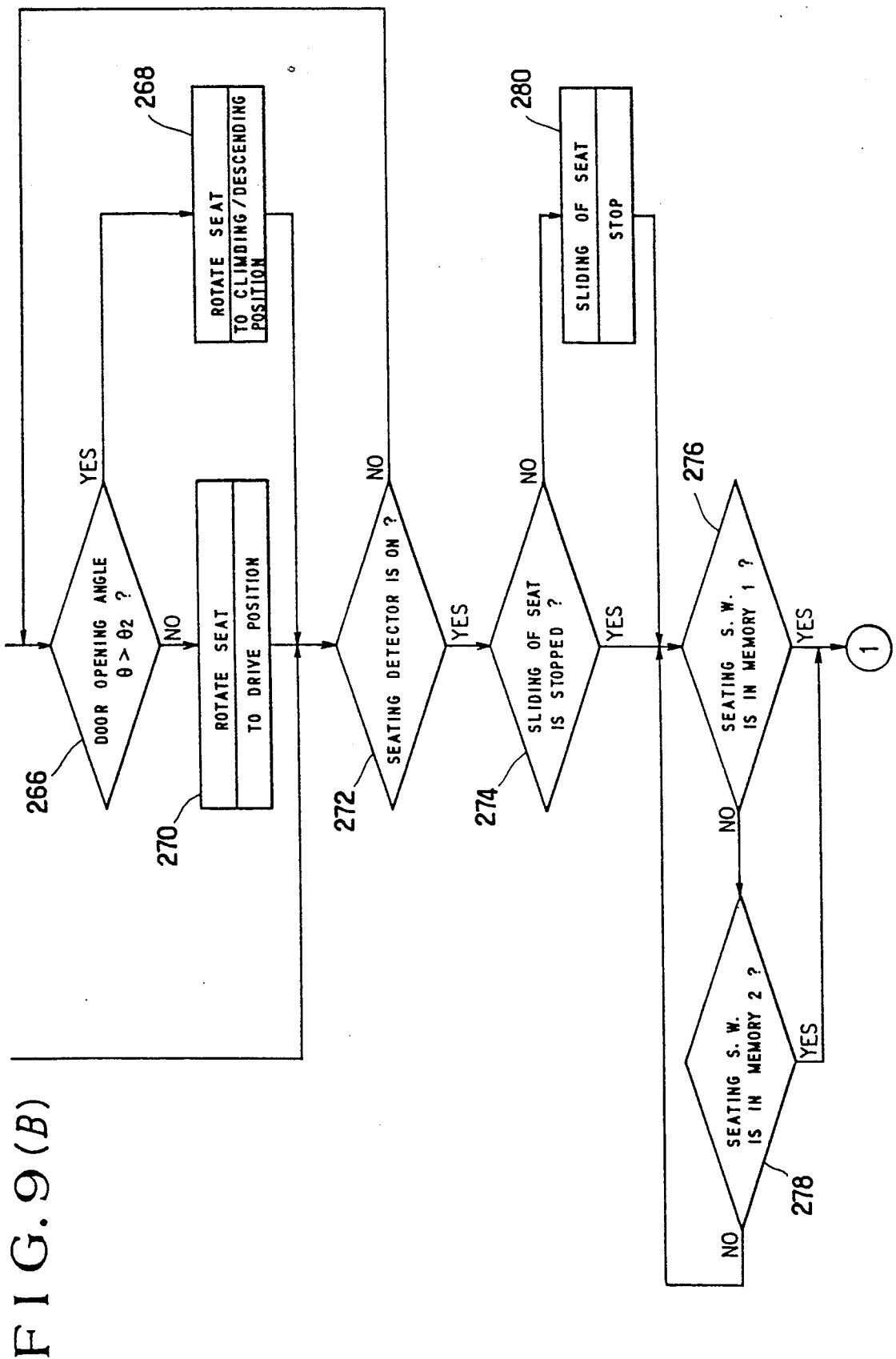
Figure 10:
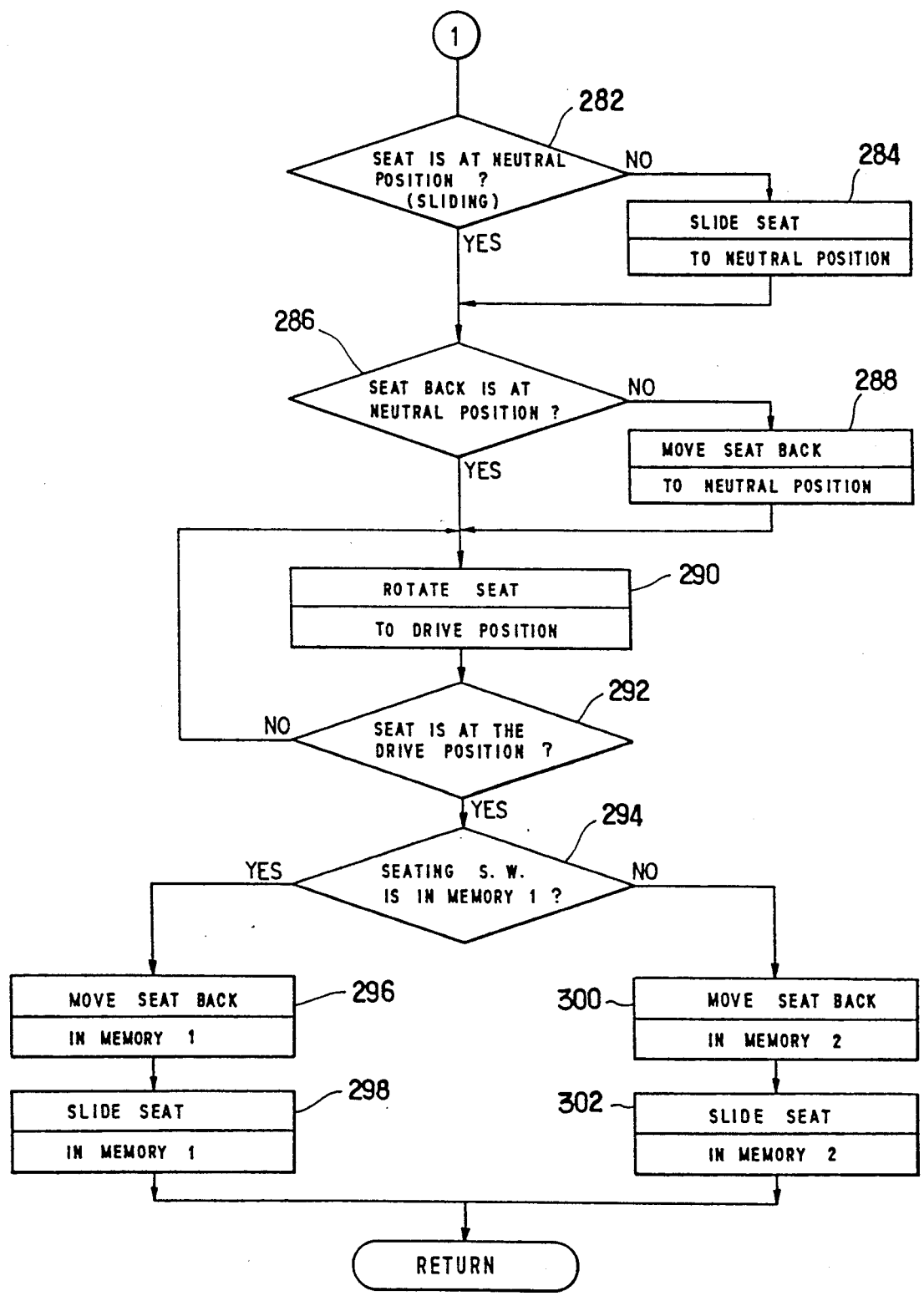

FIG. 9, which consists of FIGS. 9(A) and 9(B), illustrates a sub routine for allowing the occupant to climb onto the seat (20). According thereto, firstly, at block (252), it is determined whether the door (46) is opened at its opening angle over the first set angle ($\theta_1$), or not. Here, if not so, the CPU (16) waits for the door (46) to be opened until "YES" is decided at that block (252). When "YES" is given there, a determination is made at (254) as to whether or not the seat (20) is located at the climbing/descending position. If "YES" there, then whether or not the door (64) falls in the opening angle range of $\theta_1 \leq \theta < \theta_2$ is determined at (256). At this stage, if the seat (20) is not located at the climbing/descending position, answering "NO" at the block (254), the motor (M4) is driven to move the side support members (49) to the open position at (258), and in sequence the motors (M1)(M2) are driven to move the seat (20) and seat back (22) to the neutral position, respectively, as at (260) (262), whereby the seat (20) is set at the climbing/descending position.

With the seat (20) set at the climbing/descending position, if for example the door (46) is again closed, "NO" is answered at the block (256) and the step proceeds to a block (264) for checking up whether the opening angle of the door (46) exceeds over the second set opening angle ($\theta_2$), or not. Naturally such block (256) gives "NO" decision, and therefore, the CPU (16) waits for the door (46) to be opened. As a consequence, when the occupant opens the door (46), if the opening angle thereof exceeds the second set angle ($\theta_2$), "NO" is answered at (256) and "YES" is answered at (264), thereby leading the step to the block (266) for ascertaining whether or not the door opening angle 5 is less than the second set angle ( In this respect, if the door opening angle is larger than the second set angle ($\theta_2$), the block (266) gives "YES" answer, thus causing the rotation motor (M3) to be driven to rotate the seat (20) towards the climbing/descending position at (268), while on the other hand, if the door opening angle is less than the second set angle ($\theta_2$), "NO" is answered at the block (266), whereupon at (270) the seat (20) is rotated back to the drive position immediately by the motor (M3). In this way, the occupant on the seat (20) is positively protected against danger associated with inadvertent seat rotation and door opening.

Next, the step flow is led to block (272) for detecting whether or not the seating detector (96) is turned on. In this connection, with the seat (20) being set in either the block (270) or block (268) beforehand, turning on the seating detector (96) due to the occupant sitting on the seat (20) will result in "YES" decision being made at the block (272), thus leading the step to a block (274) for determining whether the seat (20) is stopped or not. If "YES" there, the step flow proceeds to two blocks (276)(278), in each of which, it is determined whether the climbing switch (90) is operated in the memory 1, or not, and whether the same is operated in the memory 2, or not, respectively. At this stage, let it be assumed that, after "YES" is decided at (272), with the seating detector (96) being "on", the block (274) gives "NO" decision. Then, the slide motor (M1) is immediately de-energized to stop the sliding movement of the seat (20). The subsequent step is for determining in which memory mode, i.e., the memory 1 or memory 2, the climbing switch (90) is operated. Thereafter, referring to FIG. 10, at block (282), it is determined whether the seat (20) is set at the neutral position in terms of its fore-and-aft sliding movement, or not. If the seat (20) has already been set as such, "YES" is decided at that block (282), or if not so, "NO" is decided there. In the latter case, the step is led to a block (284) for causing the seat (20) to be slidingly moved by drive of the slide motor (M1) towards the neutral position, thereby directing the step flow to a next block (286). In this way after having the seat (20) set at that neutral position, at the block (286), it is determined whether or not the seat block (22) is set at the neutral position. If "NO" is decided there, the step is led to a block (288) for driving the reclining motor (M2) to move the seat back (22) to the neutral position, thus directing the step flow to next instruction block (290). The same goes for "YES" decision at that block (286). In both cases, at the block (290), the rotation motor (M3) is driven to rotate the seat (20) towards the drive position. After the seat (20) has been rotated thereto, it is ascertained at block (292) whether or not the seat (20) is located at the drive position. Here, the rotation motor (M3) is kept to be driven, while also keeping the "NO" answer there, until the seat (20) reaches the drive position. Then, with "YES" being given at that block (292), the step is led to determination at block (294) as to whether the climbing switch (90) is operated in the memory 1, or not. At this stage, if the switch (90) was operated in the memory 1, with "YES" given at the block (276), previously, then at such block (294), "YES" is answered, thus causing the reclining motor (M2), at block (296), to be driven to incline the seat back (22) towards a memory position in the memory 1 and at block (298), the seat (20) is slidingly moved by drive of the slide motor (M1) towards a memory position in the memory 1.

On the other hand, let us assume in this context that the climbing switch (90) was operated in the memory 2, with "NO" given at the block (276) in FIG. 9(B) and "YES" is decided at the block (278) the same figure. Then, turning back to the block (294), a negative decision "NO" is made there, whereupon the step flow is directed to blocks (300) (302), in each of which, the reclining motor (M2) is driven to incline the seat back (22) towards a memory position in the memory 2, and the slide motor (M1) is driven to move slidingly the seat (20) towards a memory in the memory 2. Thereafter, the step flow is returned to the main routine in FIG. 6.

While having described the present invention thus far, it should be understood that the invention is not limited to the illustrated embodiment, but any other modifications, replacements and additions may be possible without departing from the spirit and scope of the appended claims. For example, instead of the seat (20) as a driver's seat, the invention may be applied to an assistant seat next thereto. The seat per se may be other kinds of seats, including seats for trains, airplane or ships, or other relaxation seats for multiple purposes.

What is claimed is:

1. A method for controlling a powered automotive seat of a rotatable type, in which a longitudinal motor is driven to cause said seat to be positioned between a drive position and a climbing/descending position, said drive position being a location where an occupant on said seat drives the automobile, and said climbing/descending position being a location where said occupant climbs onto or descends from said seat, said method comprising the steps of:

presetting a neutral position where a seat cushion of said seat is located in a fore-and-aft direction along a longitudinal direction of said automobile and where a seat back of said seat is located at a reclining angle forwardly and backwardly relative to said seat cushioning, allowing said seat to be rotated without contact with other adjacent fitting or things and other occupant on other seat than said seat;

causing return of said seat cushion and seat back to said neutral position, by operation of a switch means to control a drive of said longitudinal motor, when said occupant intends to get in or out of said automobile;

thereafter, causing said seat to be automatically rotated in a proper direction corresponding to said climbing/descending position;

determining whether or not said seat is located at said drive position, when said seat is located at said climbing/descending position and said occupant is about to descend from said seat;

prior to causing return of said seat to said drive position, delaying a time to drive a motor associated with rotation of said seat, so that said occupant can descend from said seat without contact with said seat; and after lapse of said delayed time, permitting drive of said motor to cause return of said seat to said drive position.

2. A method for controlling a powered automotive seat of a rotatable type, in which a motor is driven to cause said rotatable seat to be rotated between a drive position and a climbing/descending position, said drive position being a location where an occupant on said seat drives the automobile, and said climbing/descending position being a location where said occupant climbs onto or descends from said seat, said method comprising the steps of:

presetting a neutral position where a seat cushion or said seat is located in a fore-and-aft direction along a longitudinal direction of said automobile and where a seat back of said seat is located as a reclining angle forwardly and backwardly relative to said seat cushion, allowing said seat to be rotated without contact with other adjacent fittings or things and other occupant on other seat than said seat;

detecting an opening angle of a door of said automobile, when said occupant opens said door;

determining whether said door opening angle exceeds over a first opening angle, or not, said first opening angle defined at such a degree sufficient to allow said occupant to push the door a smallest possible amount for attaining a backward view;

determining whether said door opening angle exceeds over a second opening angle, or not, said second opening angle defined at such a degree sufficient to allow said occupant to push the door a smallest possible amount for avoiding contact with said occupant's foot with the door during a rotation of the seat; and causing said seat, only if said door opening angle exceeds said second opening angle, to be automatically rotated in a proper direction corresponding to said climbing/descending position.

3. The method as defined in claim 2, wherein subsequent to determining whether said door opening angle exceeds over a first opening angle, there is included a step of causing return of said seat to said neutral position in response to said door being opened by said occupant.

4. The method as defined in claim 2 wherein said opening angle of said door comprises the first opening angle and the second opening angle, and wherein there is included the step of prohibiting said automatic rotation of said seat if said door opening angle is less than said first opening angle.

5. A device for controlling a powered automotive seat of a rotatable type, in which said seat includes a seat cushion and a seat back, said device comprising:

at least one motor for effecting a fore-and-aft adjustment of said seat;

at least one motor for effecting a reclining angle adjustment of said seat back;

at least one motor for adjustably rotating said seat;

switch means operable for controlling said motors for causing movement of said seat to a proper position for allowing an occupant to climb onto or descend from said seat;

a position detecting means for detecting a neutral position of said seat and seat back and further detecting a drive position of said seat and a climbing-/descending position thereof, said neutral position being a location where said seat is located in a fore-and-aft direction along a longitudinal direction of said automobile and where said seat back is located as a reclining angle forwardly and backwardly relative to said seat cushion, allowing said seat to be rotated without contact with other adjacent fittings or things and other occupant or other seat, said drive position being a location where said occupant drives said automobile, and said climbing/descending position being a location where said occupant climbs onto or descends from said seat;

a central processing unit which processes data input from said switch means and position detecting means according to a predetermined program, and controls respective drives of said motors;

wherein, when said occupant climbs onto or descends from said seat, operating said switch means causes control of said motors so as to move said seat and seat back to said neutral position, and thereafter, said central processing unit causes automatic control of said motors associated with said rotation of said seat so as to direct said seat in a direction corresponding to said climbing/descending position; and a door detector for detecting a first and a second opening angle of a door of said automobile, and wherein if said door detector detects said door to be opened at opening angle less than said first opening angle, said central processing unit prohibits said rotation of said seat to said climbing/descending position, and wherein said door detector permits said automatic control for said rotation of said seat towards said climbing/descending position, only when said door is opened to an angle greater than said second opening angle.

* * * * *